United States Patent

Ortega

(12) United States Patent
(10) Patent No.: US 6,510,989 B1
(45) Date of Patent: Jan. 28, 2003

(54) PRICE CHECK ASSISTANT

(75) Inventor: Kerry Alan Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,160

(22) Filed: Jan. 4, 2000

(51) Int. Cl.[7] .............................................. G06K 15/00
(52) U.S. Cl. ........................ 235/383; 235/378; 235/385; 705/20; 705/22
(58) Field of Search ................................ 235/383, 385, 235/378; 705/20, 22

(56) References Cited

U.S. PATENT DOCUMENTS

| | | | | |
|---|---|---|---|---|
| 4,707,785 A | * | 11/1987 | Takagi | 235/378 |
| 4,841,442 A | | 6/1989 | Hosoyama | 364/405 |
| 4,843,546 A | | 6/1989 | Yoshida et al. | 364/403 |
| 4,859,838 A | | 8/1989 | Okiharu | 235/383 |
| 5,023,781 A | * | 6/1991 | Yamato | 364/405 |
| 5,162,639 A | * | 11/1992 | Sugiyama | 235/383 |
| 5,172,314 A | * | 12/1992 | Poland et al. | 364/401 |
| 5,347,451 A | * | 9/1994 | Fujiwara et al. | 364/405 |
| 5,382,779 A | * | 1/1995 | Gupta | 235/383 |
| 5,424,521 A | | 6/1995 | Wolfe, Jr. et al. | 235/383 |
| 5,870,714 A | | 2/1999 | Shetty et al. | 705/20 |
| 5,918,212 A | * | 6/1999 | Goodwin, III | 705/16 |
| 6,064,375 A | * | 5/2000 | Velez et al. | 345/326 |

* cited by examiner

*Primary Examiner*—Karl D. Frech
*Assistant Examiner*—Seung Ho Lee
(74) *Attorney, Agent, or Firm*—Joseph A Sawyer, Jr.; J. Bruce Schelkopf

(57) ABSTRACT

A method for assisting the recall of retail good information in a point of sale (POS) system can include the steps of scanning an identifier associated with a retail good; searching a translation table for retail good information corresponding to the scanned identifier; and, if the retail good information cannot be found in the translation table in the searching step, displaying a list of retail good information previously assigned to the scanned identifier. In a preferred embodiment, the retail good information can be a purchase price corresponding to the retail good. A POS system for assisting the recall price information can comprise: a POS terminal for processing the sale of retail goods in a retail store; a scanner for scanning retail good identifiers affixed to the retail goods; a translation table for correlating the scanned retail good identifiers with corresponding prices; a manually entered price list database for storing prices not contained in the translation table; and, graphical user interface (GUI) in the POS terminal for displaying a list of the stored prices contained in the manually entered price list database. The POS system can further comprise both accepting a manually entered price corresponding to a scanned retail good identifier; and, storing the manually entered price in the manually entered price list database.

23 Claims, 5 Drawing Sheets

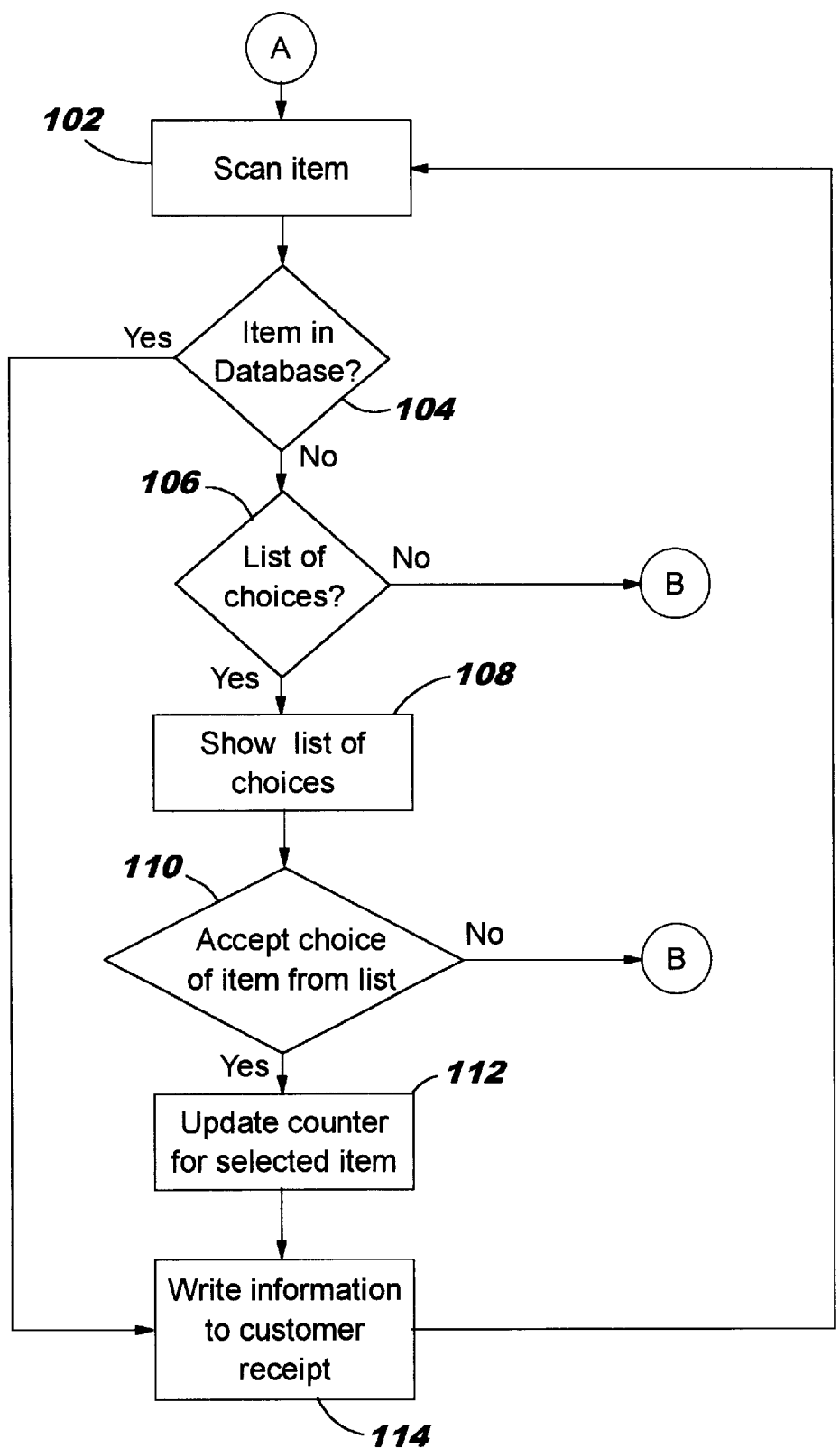

PRICE CHECK ASSISTANT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to point of sale systems and more particularly to a method and apparatus for assisting the recall of price and item information in a point of sale system.

2. Description of the Related Art

Present retail point of sale (POS) systems can incorporate an optical scanner for scanning universal product (UPC) codes incorporated on the packaging of retail goods. UPC codes typically include a Universal Product Identification Number supplied by the Uniform Code Council. Manufacturers can obtain Universal Product Identification Numbers for their retail goods by applying for the same with the Uniform Code Council. Several organizations, for instance 1-800-Database and GE Information Systems, supply databases containing a listing of all Universal Product Identification Numbers. POS systems incorporate these databases in a translation table for translating Universal Product Identification Numbers to both item and price information pertaining to a retail good.

Specifically, a retail sales cashier using a POS system can scan the UPC code contained on the packaging of a retail good thereby obtaining a Universal Product Identification Number for the retail good. Subsequently, the POS system can cross-reference a translation table with the scanned Universal Product Identification Number in order to obtain price and item information for the scanned retail good. Consequently, POS systems incorporating UPC code scanning technology can reduce the time necessary to process a check-out event during which a store check-out cashier tabulates retail goods selected for purchase by a consumer. Advantageously, by using a UPC code scanning POS system, the cashier need not manually input into the POS system price and item information for each retail good selected for purchase by the consumer.

Sometimes, during a check-out event involving present retail POS systems, the translation table may not contain price and item information corresponding to a to scanned Universal Product Identification Number. In particular, the retail good may be a new product line for which price information has not been supplied to the POS system. Alternatively, the retail good can be a sale item having a price which differs from the price listed in the translation table.

Similarly, the Universal Product Identification Number may not exist in the translation table. For example, on occasion, a retail good may not be included in a retail store's regular inventory. In each case, the check-out cashier must manually investigate the price of the unidentified retail good. Subsequently, the cashier must manually key the price into the POS system. Also, occasionally a commercially supplied UPC database may not include a Universal Product Identification Number corresponding to the scanned UPC bar code. In that case, the store cashier must manually input into the POS system not only the price of the retail good, but also the retail good's internal item number.

Present solutions to the above-identified shortcomings of present POS systems include the cashier asking a co-worker to perform a "price check" by investigating the price of other, identically labeled products. In consequence of the price check, waiting customers can be further delayed. Hence, present POS systems lack a method for storing and recalling cashier-entered information pertaining to retail goods, for example price and department.

SUMMARY OF THE INVENTION

A method for assisting the recall of retail good information in a point of sale (POS) system can comprise scanning an identifier associated with a retail good; searching a translation table for retail good information corresponding to the scanned identifier; and, if the retail good information cannot be found in the translation table in the searching step, displaying a list of retail good information previously assigned to the scanned identifier. In a preferred embodiment, the retail good information can be a purchase price corresponding to the retail good.

Additionally, the inventive method can comprise the steps of accepting a selection of retail good information in the list; and, assigning the selected retail good information to the retail good associated with the scanned identifier. In response to the selection of retail good information included in the list, the POS system can increment a counter for counting all instances of all selections of the selected retail good information. After assigning the retail good information to the scanned identifier, the POS system can add the assigned retail good information to a transaction record.

If retail good information in the list is not selected, the POS system can accept manually entered retail good information for the scanned identifier. Subsequently, the POS system can both assign the manually entered retail good information to the retail good associated with the scanned identifier and add the manually entered retail good information to the list of retail good information. However, before assigning the manually entered retail good information to the retail good, the POS system can compare the manually entered retail good information with all retail good information contained in the list. If the manually entered retail good information is a duplicate of retail good information in the list, the POS system can assign the duplicate retail good information to the scanned identifier. Moreover, the POS system can increment the counter corresponding to the duplicate retail good information.

A specific implementation of the inventive method can include a POS system for assisting the recall of retail price information. A POS system for assisting the recall of retail price information can comprise: a POS terminal for processing the sale of retail goods in a retail store; a scanner for scanning retail good identifiers affixed to the retail goods; a translation table for correlating the scanned retail good identifiers with corresponding prices; a manually entered price list database for storing prices not contained in the translation table; and, a graphical user interface (GUI) in the POS terminal for displaying a list of the stored prices contained in the manually entered price list database. The POS system can further comprise both means for accepting a manually entered price corresponding to a scanned retail good identifier; and, means for storing the manually entered price in the manually entered price list database.

The manually entered price list database of the POS system can comprise a plurality of records, each record containing a retail good identifier, a retail price, and a counter for counting each time a cashier assigns the retail price to the scanned retail good identifier. Furthermore, each record can further contain a cashier identifier for identifying a cashier who first assigns the retail price to the retail good identifier. Finally, each record can contain a date field for indicating a date when the cashier first assigns the retail price to the retail good identifier.

The GUI preferably comprises a list of manually entered prices corresponding to scanned retail good identifiers and a button for manually entering a price not included in the list of manually entered prices to be associated with the scanned retail good identifier. The list of manually entered prices can comprise a plurality of list items, each list item comprising: a retail price; a product description; a cashier name identifying a cashier who first manually entered the retail price; a date of entry indicating when the cashier first manually entered the retail price; and, a counter for counting each time a cashier assigns the retail price to a scanned retail good.

BRIEF DESCRIPTION OF THE DRAWINGS

There are presently shown in the drawings embodiments which are presently preferred, it being understood, however, that the invention is not limited to the precise arrangements and instrumentalities shown.

FIGS. 4A–4B, taken together, is a flow chart illustrating the inventive method.

DETAILED DESCRIPTION OF THE INVENTION

Figure 1:
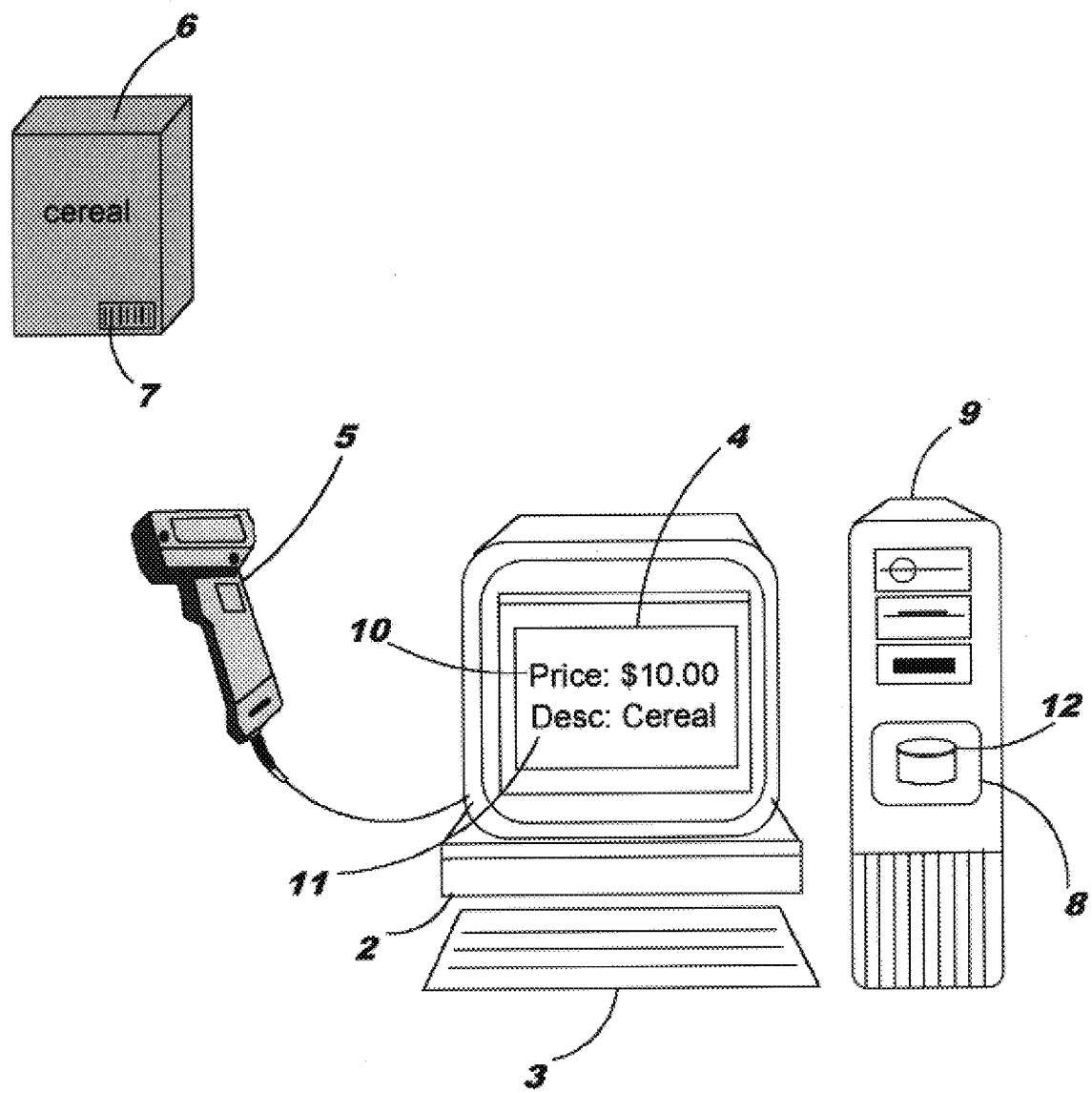
FIG. 1 is a pictorial representation of a POS system incorporating UPC scanning technology.

Recently, retail POS systems have begun to incorporate GUI interfaces for providing retail store cashiers with retail good information in addition to product price. FIG. 1 is a schematic diagram of a typical retail POS system incorporating a GUI interface and bar code scanning technology. A typical retail POS system 1 generally can include a POS computer 9 having a fixed memory 8, cash drawer 2, a keyboard 3, a GUI display 4 and a bar code scanner 5. Using the bar code scanner 5, a retail cashier can scan a bar code label 7, for example a UPC label, affixed to the packaging of a retail good 6. The POS system 1 can extract from the scanned bar code label a unique product identification number, for example a Uniform Product Identification Number.

Subsequently, the POS system 1 can cross-reference the scanned identification number in a translation table 12 in the fixed memory 8 and can extract a price 10, and optionally a product description 11, corresponding to the retail good 6. Ultimately, the typical POS system 1 can display the price 10 and description 11 in the GUI display 4 and can create a record of the purchase in a receipt (not shown). In addition, associated retail good information, for example the optional product description 11 can be written to at least one electronic record for documenting the transaction. In consequence, the typical retail POS system 1 can assist the retail store cashier with the check-out event. However, because the typical POS system 1 is dependent on the translation table 8, the typical retail POS system 1 cannot assist the retail store cashier with a check-out event relating to a product lacking adequate price and product information in the translation table 8.

Figure 2:
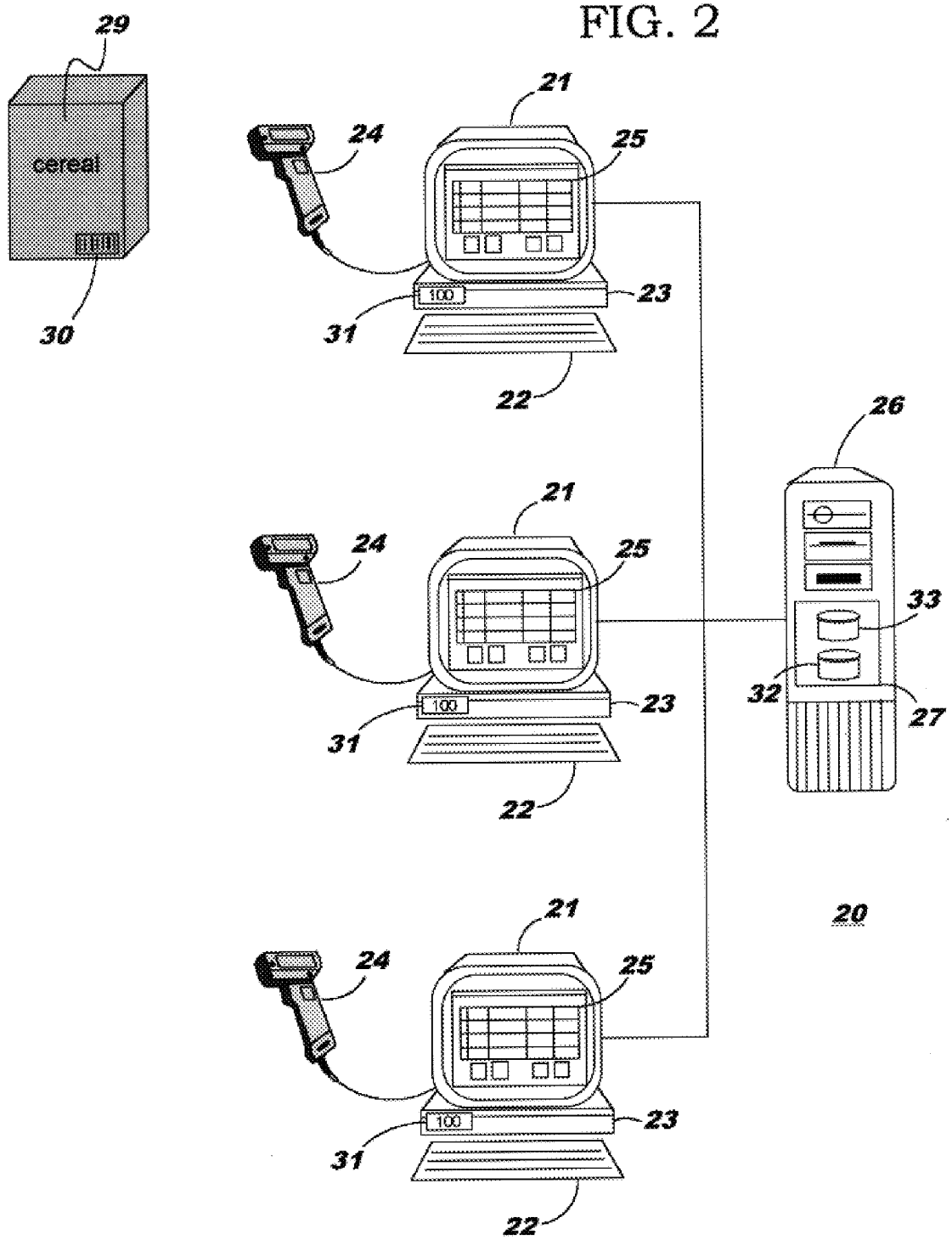
FIG. 2 is a pictorial representation of a POS system incorporating UPC scanning technology in accordance with the inventive arrangements.

FIG. 2 illustrates a POS system in accordance with the inventive arrangements. The present invention, as shown in the figure, capitalizes on retail POS systems having GUI displays in providing a solution to the problem of identifying price and product information for a retail good having inadequate price and product information in the translation table. As shown in FIG. 2, the POS system 20 in accordance with the inventive arrangement can include a network 28 of POS terminals 21. Each POS terminal 21 can include a keyboard 22, a cash drawer 23, a GUI display 25 and a bar code scanner 24 for reading a bar code 30 affixed to the packaging of a retail good 29. In addition, each POS terminal 21 can include a fixed memory 31 for storing computer instructions for executing a method 100 for assisting a retail store cashier in recalling price and item information.

In a preferred embodiment of the present invention, the POS system 20 further includes a POS computer 26 which can contain a fixed memory 27 preferably having both a translation table 32 and a manual price list database 33 stored therein. The translation table 32 can include a list of Universal Product Identification Numbers and corresponding product prices and information. Each time a store cashier scans a bar code 30, the POS system 20 can identify the Universal Product Identification Number associated with the scanned bar code and can search the translation table 32 for a price corresponding to the associated Universal Product Identification Number.

However, if a corresponding price is not found in the translation table 32, the POS system 20 can allow the retail store cashier to manually enter a corresponding price. Advantageously, the POS system 20 can store product prices, manually entered by store cashiers, each time a product price cannot be retrieved from the translation table 32 in response to scanning the bar code 30 on the packaging of a retail good 29. As shown in FIG. 2, the manually entered price can be stored in the manual price list database 33. During a subsequent check-out event, if a product price cannot be retrieved from the translation table 32 in response to scanning the bar code 30 on the packaging of a retail good 29, the POS system 20 can consult the manual price list database 33. In particular, the POS system 20 can retrieve a list of all manually entered prices relating to the retail good 29 in question and can display the list to the retail store cashier in the GUI display 25.

Figure 3:
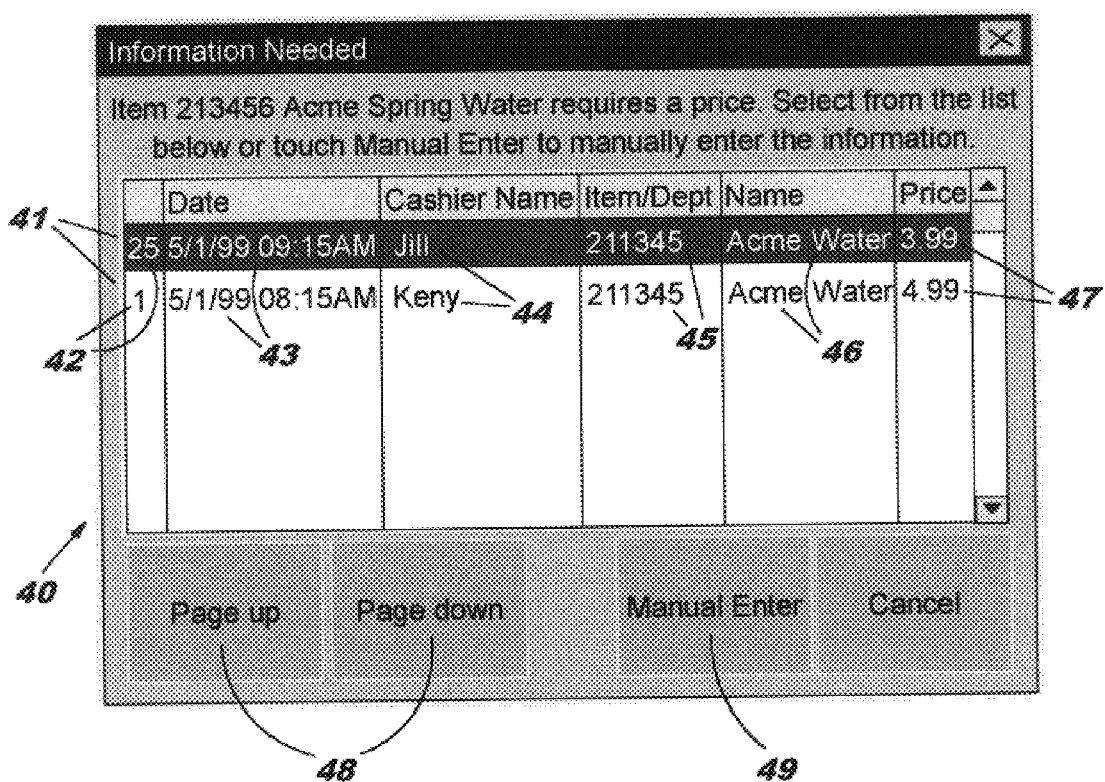
FIG. 3 is a screen shot of a graphical user interface for use with the inventive arrangements.

FIG. 3 illustrates a preferred arrangement of the GUI display 25. As shown in the figure, the GUI display 25 can include a list of manually entered prices 40. Each list entry 41 can include a product name 46, a manually entered price 47, an item number 45, the name 44 of the cashier who had manually entered the price, the date 43 on which the cashier last updated the price 47, and a counter 42 indicating the number of times the listed price 47 had been manually selected. The GUI display 25 can further include page up and page down buttons 48 for scrolling through the list 40. Finally, the GUI display can include a manual enter button 49 for allowing a cashier to manually enter a price instead of selecting a price 47 from among those included in the list 40.

Significantly, the list of manually entered prices 40 can include prices 47 both manually entered by the retail store cashier performing the check-out event and other retail store cashiers residing at other POS terminals 21. Using the GUI display 25, the retail store cashier performing the check-out can either select one of the listed prices 47 as the price to be written to the receipt, or the retail store cashier can manually enter a different price for the retail good in question by clicking on the manual enter button 49.

In the preferred embodiment, the GUI display 25 can be a touch screen with which the cashier can select a listed price 47 by touching the displayed choice, for example with the cashier's finger. However, one skilled in the art will recognize that the invention is not limited in this regard. Rather, any user input method can suffice. For example, it is well-known in the POS systems art to use a mouse, keyboard or other input device to provide a medium of interaction between a cashier and the POS system.

Figure 4B:
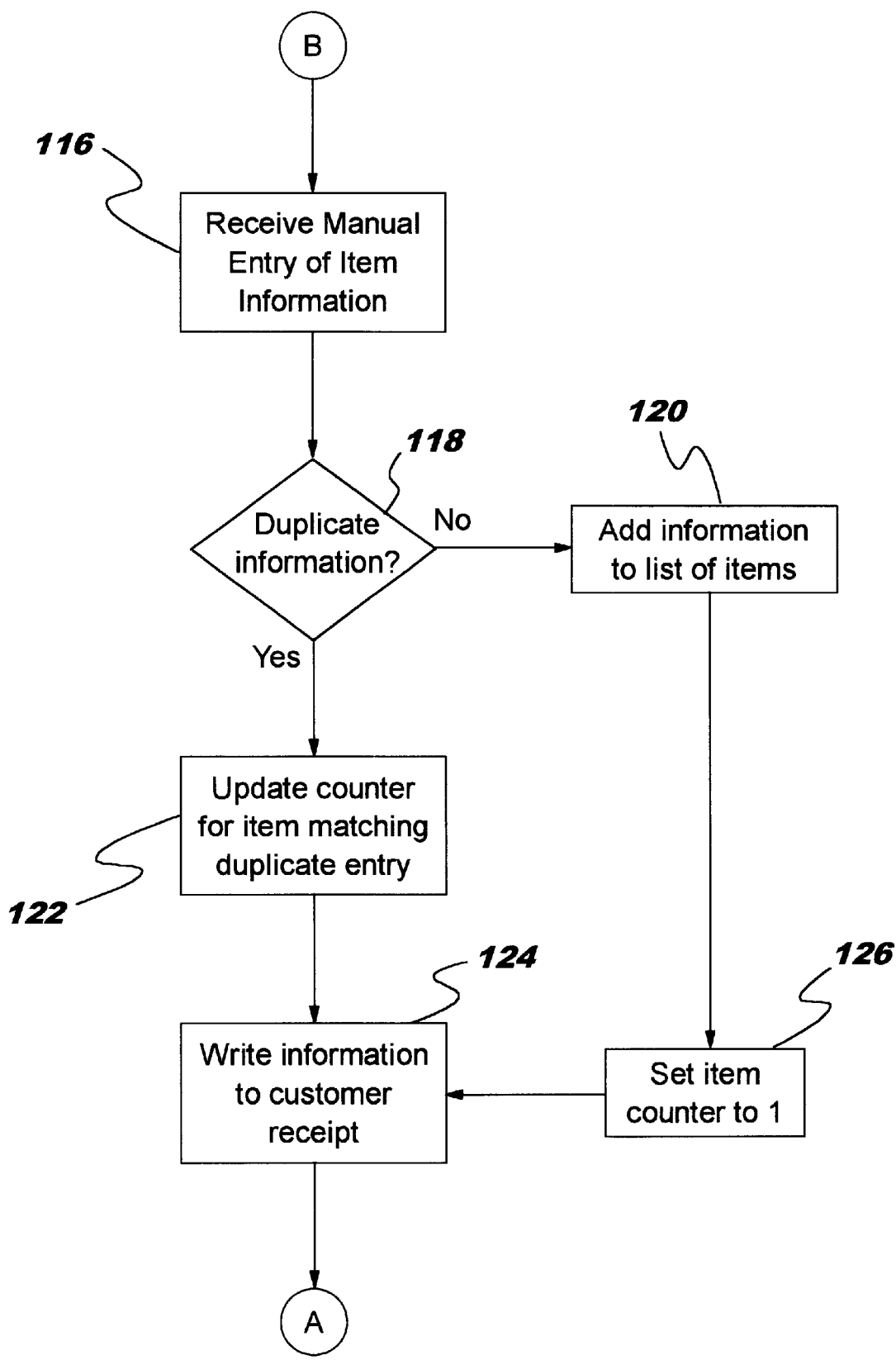

FIGS. 4A and 4B, taken together, illustrate an exemplary process 100 for assisting a cashier in recalling price and item information in a POS system. The inventive method, hereinafter described for illustrative purposes with reference to the apparatus shown in FIGS. 2 and 3, begins in step 102 in which a cashier at a POS terminal 21, using a bar code reader 24, can scan a bar code 30 affixed to a retail good 29 selected by a customer for purchase. As one skilled in the art will recognize, the bar code reader 24 can refer to the combination of a bar code scanner and bar code decoder which can transform an electrical signal from the bar code scanner into ASCII (American Standard Code for Information Interchange) representations of the bar code data.

The bar code 30 can include a UPC code, however, the present invention is not limited in this regard. Rather the bar code 30 can be one of many available bar codes, for example UPC, EAN, Code 39, Code 128, etc. The bar code reader 24 can translate the scanned bar code 30 into a product identification code, for example the Universal Product Identification Number, and can output the code to the POS terminal 21.

In decision step 104, the POS terminal 21 can search the translation table 32 in the POS server 26 for an entry corresponding to the product identification code, received from the bar code reader 24. If the POS terminal 21 identifies a price entry in the translation table 32, the identified price can be written to a customer receipt (not shown) in step 114. Subsequently, the cashier can scan another item.

If, however, in decision step 104, the POS terminal 21 fails to identify a price entry in the translation table 32, in decision step 106, the POS terminal 21 can search the manual price list database 33 to determine if a cashier had previously manually entered a price for the scanned retail good 29. If the POS terminal 21 identifies a previously entered price for the scanned retail good 29, in step 108, the cashier can be presented with a list of previously entered prices 40 for the scanned retail good 29. More particularly, the list of previously entered prices 40 can be displayed in the GUI display 25 as shown in FIG. 3.

In decision step 110, the cashier can select one of the records 41 presented in the list of previously entered prices 40 having an appropriate price. If the cashier chooses a previously entered price 47 in decision step 110, the counter 42 associated with the selected price 47 can be incremented in step 112 to indicate to subsequent cashiers that another cashier has manually chosen the selected price 47 for the scanned retail good 29. Finally, the selected price 47 can be written to the customer receipt (not shown) in step 114. In addition, associated retail good information can be recorded for purposes of documenting the above-described transaction. Subsequently, the cashier can scan another item.

However, in decision step 106, if the POS terminal 21 fails to identify a previously entered price for the scanned retail good 29, passing through jump circle B to the flow chart in FIG. 4B, in step 116, the cashier can choose to manually enter a price for the scanned retail good 29. Similarly, if in decision step 110 the cashier chooses not to select a listed price 41, the cashier can choose to manually enter a price for the scanned retail good in step 116 by clicking on the manual enter button 49. In either event, in decision step 118, the POS system 20 can recognize a duplicate price for the scanned retail good 29. If the cashier enters a duplicate price for the scanned retail good, the POS system 20 will treat the transaction as if the cashier had selected the duplicate price from the list of manually entered prices. As such, in step 122, the counter associated with the selected price can be incremented as in step 112.

If, however, in decision step 118, the cashier has entered a new price for the scanned retail good, the new price, in addition to the existing product information, can be added to the manual price list database in step 120. In addition, in step 126, the counter associated with the new price can be set to "1". Subsequently, regardless of whether the cashier has entered a new or duplicate price in step 116, the chosen price can be written to the customer's receipt in step 124. Having written the chosen price to the customer's receipt in step 124, leading through jump circle A back to FIG. 4A, the cashier can scan another retail good.

Thus, in accordance with the inventive arrangement, when a cashier scans a bar code of a retail good, if price information corresponding to that retail good is not included or available in an associated translation table, the inventive system can present to the cashier a list of prices selected by other cashiers (or the same cashier) in the past. Additionally, the inventive system can store the cashier's price selection for that retail good in a database for subsequent reference by other cashiers (or the same cashier).

In consequence, cashiers can be presented with the missing price information on demand. In using a system implementing the inventive method, cashiers need not interrupt the check-out event in order to request a "price check." Furthermore, using the inventive method, cashiers need not usurp the time and efforts of other store employees to identify the price of a retail good not reported by a conventional POS system. Additionally, the price check efforts of a cashier need not be repeated in consequence of the inventive method. Rather, the inventive method can capitalize on price determinations formulated during previous check-out events and accumulated in a manual price list database.

What is claimed is:

1. A method for assisting a recall of retail good information in a point of sale (POS) system comprising the steps of:
    scanning an identifier associated with a retail good;
    searching a translation table for retail good information corresponding to said scanned identifier; and,
    if said retail good information cannot be found in said translation table in said searching step, displaying a list of manually entered retail good information previously assigned to said scanned identifier.

2. The method of claim 1, further comprising the steps of:
    accepting a selection of retail good information in said list; and,
    assigning said selected retail good information to said retail good associated with said scanned identifier.

3. The method of claim 2, further comprising the steps of:
    accepting manually entered retail good information for said scanned identifier;
    assigning said manually entered retail good information to said retail good associated with said scanned identifier; and, adding said manually entered retail good information to said list of retail good information.

4. The method of claim 3, further comprising the steps of:
comparing said manually entered retail good information with all retail good information contained in said list; and,
if said manually entered retail good information is a duplicate of retail good information in said list, assigning said duplicate retail good information to said scanned identifier.

5. The method according to claim 4, further comprising the step of incrementing a counter corresponding to said duplicate retail good information.

6. The method of claim 2, further comprising the step of incrementing a counter corresponding to said selected retail good information wherein said counter can count all instances of all selections of said selected retail good information.

7. The method according to claim 2, further comprising the step of recording said assigned retail good information in a transaction record.

8. The method according to claim 1, wherein said retail good information is a purchase price corresponding to said retail good.

9. A POS system for assisting a recall of retail good information, comprising:
a POS terminal for processing the sale of retail goods in a retail store;
a scanner for scanning retail good identifiers affixed to said retail goods;
a translation table for correlating said scanned retail good identifiers with corresponding prices;
a manually entered price list database for storing prices not contained in said translation table; and,
a graphical user interface (GUI) in said POS terminal for displaying a list of said stored prices for a particular retail good identifier contained in said manually entered price list database.

10. The POS system of claim 9, further comprising:
means for accepting a manually entered price not displayed in said GUI corresponding to a scanned retail good identifier; and,
means for storing said accepted manually entered price in said manually entered price list database.

11. The POS system of claim 9, wherein said manually entered price list database comprises a plurality of records, each record containing a retail good identifier, a retail price, and a counter for counting each time a cashier assigns said retail price to said scanned retail good identifier.

12. The POS system of claim 11, wherein each record further contains a cashier identifier for identifying at least a first cashier who assigns a retail price to said retail good identifier.

13. The POS system of claim 12, wherein each record further contains a date field for indicating a date when said cashier assigns said retail price to said retail good identifier.

14. The POS system of claim 9, wherein said GUI comprises:
a list of manually entered prices corresponding to scanned retail good identifiers; and,
a manual enter button for manually associating a price not included in said list of manually entered prices with said scanned retail good identifier.

15. The POS system of claim 14, wherein said list of manually entered prices comprises a plurality of list items, each list item comprising:

a retail price;
a product description;
a cashier name identifying a cashier who first manually entered said retail price;
a date of entry indicating when said cashier first manually entered said retail price; and,
a counter for counting each time a cashier assigns said retail price to a scanned retail good.

16. A computer apparatus programmed with a set of instructions stored in a fixed medium, said programmed computer apparatus comprising:
means for scanning an identifier associated with a retail good;
means for searching a translation table for retail good information corresponding to said scanned identifier; and,
means for displaying a list of manually entered retail good information previously assigned to said scanned identifier if said retail good information cannot be found in said translation table by said searching means.

17. The computer apparatus of claim 16, further comprising:
means for accepting a selection of retail good information in said list; and,
means for assigning said selected retail good information to said retail good associated with said scanned identifier.

18. The computer apparatus of claim 17, further comprising:
means for accepting manually entered retail good information for said scanned identifier;
means for assigning said manually entered retail good information to said retail good associated with said scanned identifier; and,
means for adding said manually entered retail good information to said list of retail good information.

19. The computer apparatus of claim 17, further comprising means for incrementing a counter corresponding to said selected retail good information wherein said counter can count all instances of all selections of said selected retail good information.

20. The computer apparatus of claim 18 further comprising:
means for comparing said manually entered retail good information with all retail good information contained in said list; and,
means for assigning said duplicate retail good information to said scanned identifier if said manually entered retail good information is a duplicate of retail good information in said list.

21. The computer apparatus according to claim 20, further comprising means for incrementing a counter corresponding to said duplicate retail good information.

22. The computer apparatus according to claim 17, further comprising means for writing said assigned retail good information to a customer receipt.

23. The computer apparatus according to claim 16, wherein said retail good information is a purchase price corresponding to said retail good.

* * * * *